(12) United States Patent
Joy et al.

(10) Patent No.: US 9,769,121 B2
(45) Date of Patent: Sep. 19, 2017

(54) SCALABLE, SELECTIVE TRAFFIC PROXYING

(75) Inventors: Jon Joy, Seattle, WA (US); Derk Adair Benisch, Duvall, WA (US); Tom Janes, Redmond, WA (US); James Boerner, Marysville, WA (US); Michael Sitler, Edmonds, WA (US); Anthony Paul Penta, Bellevue, WA (US); Zachariah Morgan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 570 days.

(21) Appl. No.: 13/230,726

(22) Filed: Sep. 12, 2011

(65) Prior Publication Data

US 2013/0067023 A1  Mar. 14, 2013

(51) Int. Cl.
*G06F 15/16* (2006.01)
*H04L 29/06* (2006.01)

(52) U.S. Cl.
CPC ...... *H04L 63/0421* (2013.01); *H04L 63/1458* (2013.01)

(58) Field of Classification Search
USPC .............. 709/200, 203, 217, 226; 726/3, 24
See application file for complete search history.

(56) References Cited

U.S. PATENT DOCUMENTS

| | | | |
|---|---|---|---|
| 7,113,698 B1 * | 9/2006 | Ryhorchuk et al. | 398/10 |
| 8,190,682 B2 * | 5/2012 | Paterson-Jones et al. | 709/205 |
| 2006/0136374 A1 | 6/2006 | Shelest et al. | |
| 2007/0174915 A1 | 7/2007 | Gribble et al. | |
| 2008/0010683 A1 | 1/2008 | Baddour et al. | |
| 2008/0229095 A1 * | 9/2008 | Kalimuthu et al. | 713/153 |
| 2009/0129341 A1 * | 5/2009 | Balasubramanian et al. | 370/331 |
| 2010/0100962 A1 * | 4/2010 | Boren | 726/25 |

OTHER PUBLICATIONS

Qassrawi, et al. "Detecting Malicious Web Servers with Honeyclients", Retrieved at <<http://ojs.academypublisher.com/index.php/jnw/article/download/0601145152/2559>>, Journal of Networks, vol. 6, No. 1, Jan. 2011, pp. 145-152.

(Continued)

*Primary Examiner* — El Hadji Sall
(74) *Attorney, Agent, or Firm* — Cooper Legal Group, LLC

(57) ABSTRACT

Proxy networks enable a source to send traffic to one or more targets through a set of nodes operating as proxies. However, proxy networks are typically nonselective (often by design), and do not enable a source to specify properties of the nodes selected as proxies to send traffic to the target. Presented herein are proxy network techniques that enable sources to specify node properties in a target request, and that utilize a set of node managers for respective subsets of nodes. For a target request specifying selected node properties, the node managers may select as proxies nodes having the node properties specified in the target request. Additionally, the techniques presented herein promote the flexibility of the proxy network (e.g., adding groups of nodes, expanding the variety of nodes and node properties, and sending various forms of traffic using any protocol to various topics on behalf of many and various sources).

20 Claims, 8 Drawing Sheets

(56) References Cited

OTHER PUBLICATIONS

Wang, et al., "Automated Web Patrol with Strider HoneyMonkeys", Retrieved at <<http://research.microsoft.com/pubs/70182/tr-2005-72.pdf>>, Technical Report MSR-TR-72, May 4, 2005, pp. 0-11.
Laskos, Tasos Zapotek., "Arachni—Web Application Security Scanner Framework", Retrieved at <<https://github.com/Zapotek/arachni#readme>>, Retrieved Date: Jun. 13, 2011, pp. 10.
"How Google Works" Retrieved at <<http://www.googleguide.com/google_works.html>>, Retrieved Date: Jun. 13, 2011, pp. 5.
Zvelo., "Obfuscated URLs no match for zveloNET™", Retrieved at <<http://zvelo.com/blog/entry/web-filtering/obfuscated-urls-no-match-for-zvelonetu2122>>, Mar. 22, 2010, pp. 2.

\* cited by examiner

SCALABLE, SELECTIVE TRAFFIC PROXYING

BACKGROUND

Within the field of computing, many scenarios involve a proxying network arrangement, where a node on the network forwards traffic on behalf of a source. As a first example, in a virtual private network, a source in an unsecured environment (e.g., a public wireless network) may send network requests to a proxy in a secured environment (e.g., a trusted home or organization network). By sending the requests in an encrypted manner to the proxy, and by configuring the proxy to resend the requests, the source may achieve the transmission of requests as if they had originated at the proxy within the trusted environment, and may avoid the eavesdropping vulnerabilities of sending traffic in an unencrypted manner from the unsecured environment. As a second example, in an anonymizing proxy network, it may be desirable to send traffic that is untraceable back to the source of the traffic. Therefore, one or more proxies may be configured to receive traffic from various sources and to retransmit the traffic without retaining records as to the identity of the source. In one such scenario, a large body of nodes may be configured to exchange anonymized traffic, such that a request may be traced back to one of the many nodes that automatically forward requests, but may not be traced further back to the source of the request.

Also within the field of computing, many scenarios involve an attempt to examine a content source, such as a server of software or information. This examination is often performed in an automated manner; e.g., a "crawler" application may be configured to request a first content set (e.g., a first web page provided by a webserver), to identify content sets that are associated with the first content set (e.g., other web pages and resource that are hyperlinked within the first web page), and to request and examine the associated content sets in an iteratively expanding examination. As one such scenario, a malware reporting server may be configured to examine various web resources that are reported as suspicious (e.g., particular devices, domains, websites, services, or resources), and may do so by "crawling" associated websites and resources that are suspected of providing suspicious and potentially malicious content. By "crawling" these websites, the malware reporting service may identify resources that are associated with a resource that is identified as malicious (e.g., finding other resources that interoperate with the malicious resource or other websites that feature similar malicious content).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While proxying services may provide many advantages, many implementations may exhibit some disadvantages. As a first exemplary disadvantage, many proxying services provide little or no capability to select or control which nodes finally send the request on behalf of the source, e.g., for a large pool of proxies, a source may be able to request that one or more proxies transmit a particular request, but may not be permitted to specify which proxy transmits the request, nor any characteristics of the proxies that may transmit the request. In many such services, this incapacity is by design; e.g., an anonymizing proxy service may be configured to hide the identity of the sending node from the source and/or the identity of the source from the sending node in order to promote the degree of anonymity provided by the proxying service. Indeed, in many such scenarios, the source may not be interested in the identity or properties of the sending proxy node, but may only be interested in ensuring that the traffic is resent from any one or more proxies.

However, in other scenarios, a source of data to be sent by one or more proxies may be interested in controlling the selection and properties of proxies for sending a particular request. As one example, a malware detection service may be interested in examining a resource hosted by a server, but the server may be configured to respond differently to requests for the resource based on the source of the request. As a first example, a server may be configured to send malware only to clients having particular node properties (e.g., only nodes operating a platform that is compatible with the malware, such as a particular operating system, or having sufficient bandwidth to facilitate the transmission of spam or denial of service (DoS) attacks), and to respond to requests for the resource from other nodes with comparatively benign comment in order to improve the efficiency of the delivery of malware. As a second example, the server may be configured to evade detection by providing benign content in response to requests from sources associated with malware detection services, and providing malware in response to requests from other sources. In view of these and other tactics, the malware detection service may be configured to explore the server more fully by sending the requests through a proxy network, and examining the responses provided by the server to the requests from a variety of nodes. More particularly, it may be advantageous to configure the malware detection service to select, among the nodes of the proxy select, a subset of nodes having particular node properties to transmit traffic to a particular target.

As a second exemplary disadvantage, many proxy networks are difficult to scale to include a large number of additional nodes. For example, in a centrally administrated proxy network, a single server or server set may store information about all of the proxies comprising the network, and to make connections among the proxies (e.g., upon receiving a request from a source to send a request, selecting a sequence of one or more proxies to exchange the request, and initiating the connections among the proxies to establish the sequence). However, as the size of the proxy network scales up, the centralized administration of the proxy service may exhaust the computing resources of the administrating server or server set and may result in a degradation of service quality. As another example, the architecture of the proxy network may limit the scalability of the proxy network; e.g., it may be difficult to adapt a proxy network designed for a particular usage scenario (e.g., a directed network for receiving requests from a single source to generate traffic) to include a new set, type, or variety of nodes, and/or to adapt the network to new usage scenarios for different types of traffic.

Presented herein are proxying techniques that enable selectivity of the proxies selected to transmit a particular request for traffic to a target, as well as the scalability of the proxy network to expand to include additional nodes, to include nodes of additional varieties, and/or to suit additional usage scenarios. In accordance with these techniques, the proxy network may be devised as a set of node managers, each configured to manage a set of nodes (e.g., network end points that transmit a particular request). In particular, the node managers may detect and track various node properties of the respective managed nodes, such as the type of device, operating environment, network addresses, network connection types, available bandwidth, and geographic location of the node. A source may initiate a request to send traffic to a particular target (e.g., a "target request"), and may specify a particular set of node properties of the nodes sending the traffic (e.g., nodes in a particular geographic location and/or utilizing a particular type of network connection). In accordance with these techniques, the source, or a matchmaking service operating on behalf of the source, may receive network descriptors from one or more node managers; may select node managers that manage nodes having the selected node properties; and may send to these node managers a traffic request, e.g., a request to instruct nodes having the selected node properties to send traffic to the requested target. Accordingly, the selected node managers may receive the traffic request, may select nodes having the selected node properties, and may request the selected nodes to send the requested traffic to the target. The nodes may also deliver the results of the traffic requests to the source(s) without revealing the identity of the source to the target.

In this manner, the proxy network may enable one or more sources to send traffic to one or more targets through a distributed set of proxies, and in particular through a subset of nodes having a selected set of node properties. This technique may be generally applied to many sources and targets, may utilize many types of nodes, and may send traffic in a protocol-agnostic manner (e.g., sending traffic via HTTP, HTTPS, FTP, or any other protocol). Additionally, the modular nature of the architecture may facilitate scaling (e.g., accommodating additional nodes through the addition of node managers; adding nodes of different varieties through the specification of a different set of node properties; and/or providing a generalized framework for proxying services that supports a variety of sources and scenarios).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
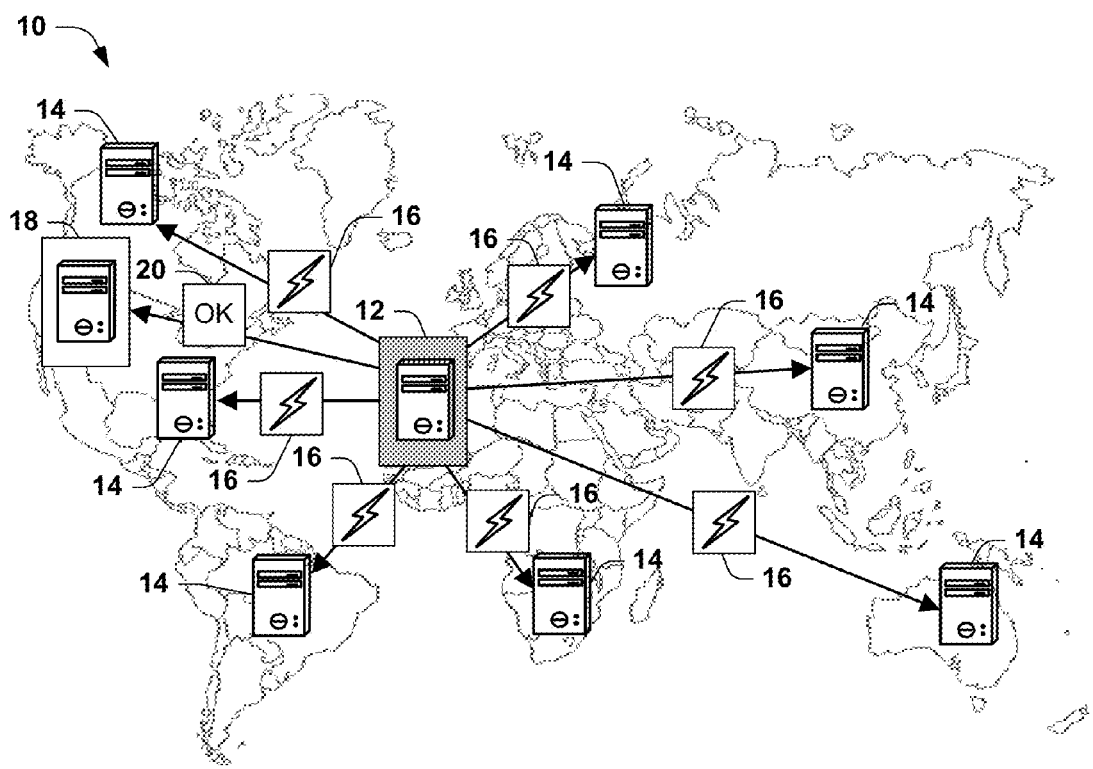
FIG. 1 is an illustration of an exemplary scenario featuring a provision of malware from a malware source to a set of requesting devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a proxy network, wherein a set of nodes interoperates to distribute a set of network requests across the set of nodes comprising the proxy network. For example, a set of nodes may join the proxy network, and a node that initiates a network request (such as a source of traffic to be sent to a particular target, such as a server) may request the proxy network to transmit the request through one or more other nodes of the proxy network. In a centralized proxy network, the source may send the request to a central administrator of the proxy network, which may select other nodes of the proxy network and forward the request to such nodes, which may transmit the request on behalf of the source. In a decentralized proxy network, the source may select one or more peer nodes to which the source is connected (e.g., selected randomly, by proximity, or based on network load) and may send the request to the peer nodes, which may transmit the request out through the network to the target on behalf of the source and/or transmit the request to still other nodes for transmission to the target. Additionally, if the target reacts to the request (e.g., providing a particular response, delivering a requested resource, and/or taking a particular action), the proxy nodes transmitting the request may notify the source of the result of the traffic.

Proxy networks may be utilized in many scenarios. As a first example, a virtual private network (VPN) may be established that enables a source of traffic to send the traffic from within the domain, network address block, and/or geographic location of a physical private network, even if the source is not located within the physical area of the private network. For example, a private network (e.g., a home network or an organization network) may be connected to the internet through a trusted provider through which requests to various targets may be securely sent on behalf of devices. The physical network may comprise a set of devices in physical proximity, e.g., those that are connected through the wired networking hardware of the private network, and/or that are within sufficient proximity to communicate wirelessly with the trusted networking hardware. However, a device that is authorized to send requests within this network may be located in a different area that is outside of the physical networking and wireless networking range of the private network, but may nevertheless be able to communicate with the devices of the private network through an untrusted connection (e.g., an untrusted public network may include eavesdroppers configured to intercept the communications of other devices of the public network). If the device is able to communicate with the trusted network over the untrusted connection, then the device may utilize encryption to communicate with the trusted network. Moreover, the device may send to the private network requests for traffic to particular targets, and may send such requests to the private network over the untrusted network in an encrypted manner. The private network may be configured to receive and decrypt the requests, and to send the requests on behalf of the device through a proxy within the private network. In this manner, the device may send requests from the private network despite the absence of proximity (including the absence of direct physical connection and/or direct wireless communication) with the private network, and may do so in a manner that is less vulnerable to eavesdropping by other nodes of the untrusted network.

As a second example, an anonymizing proxy service may be utilized to obscure a source of network traffic from the target of the traffic and/or from eavesdroppers outside of the proxy network. For example, a node may initiate a request to send network traffic to a particular target in an anonymous manner (e.g., an anonymous source of information to be transmitted to a news agency), and may therefore utilize a proxy network to retransmit the information in a manner that obstructs tracing of the traffic back to the source. The proxy network may request one or more other nodes of the proxy network to send the request outside of the proxy network to the target without disclosing any information as to the identity of the source. The proxy may therefore forward the request (possibly through additional proxies that further obfuscate the source of the request), and/or may dispose of any information as to the sender of the request, such that even if the proxy is accessed, no information may be obtained as to the identity of the source of the request. In many such scenarios, a large set of proxy nodes, potentially comprising thousands of devices, may automatically distribute and forward requests for network traffic initiated by any of the nodes, and it may therefore be very difficult to identify the particular node comprising the source of the request. Proxy networks may be advantageously utilized in many legitimate and nefarious scenarios, including an efficient delivery of data (e.g., file-sharing proxy networks such as BitTorrent), the establishment and maintenance of a well-interconnected set of devices (e.g., an ad hoc wireless proxy network), and distributed denial of service (DDoS) networks.

In particular, proxy networks are often utilized in order to explore network sources and resources (e.g., while "crawling" a website). For example, an exploration service may seek to interact with and evaluate a targeted server, device, service, or domain. One such scenario involves the field of malware, wherein a particular server that is identified as suspicious may be examined by a malware detection service, and the resources provided by the server may be examined to determine whether the server is transmitting malware. However, a malware server may be configured to respond to requests differently based on the source of the request. As a first example, a malware server may distribute malware only to particular types of devices, such as those utilizing an operating environment that is compatible with the malware (e.g., an operating system, application programming interface (API), or protocol against which the malware is targeted). The malware server may therefore be configured to provide the malware only to sources of requests for the malware that expose the targeted operating environment; and for requests initiated by other types of sources, the malware server may not provide the malware (and may not respond at all), thereby conserving the resources of the malware server and improving its efficiency in the distribution of malware. As another example, the malware server may seek to evade detection by not providing the malware to malware detection services. Therefore, the malware server may be configured to respond to requests for the malware by evaluating the source of the request (e.g., comparing the network address of the source of the request with a set of network addresses known to be utilized by malware detection services), and may respond to such requests in a benign manner (e.g., providing a version of a requested resource that does not include the malware), while continuing to provide the malware in response to requests from other sources.

FIG. 1 presents an illustration of an exemplary scenario 10 featuring a server configured to distribute malware 16 to a set of nodes 14 accessible over a network (such as the internet). The malware 16 may be sent to the nodes 14 spontaneously by the server (e.g., a spam server that distributes unsolicited bulk email messages to recipients, possibly embedding or linked to malware such as trojans, viruses, spyware, and adware), and/or may send the malware upon request from a node 14 (e.g., in a phishing scenario, a user may inadvertently access the malware server instead of a trusted node, such as through a typographical error in a uniform resource identifier (URI) typed into a web browser). A malware detection service may receive information that the malware server is operating in a suspicious manner, and may therefore endeavor to interact with the malware server and examine the interactions with and the resources provided by the malware server in order to assess the malignant or benign nature of the server. Thus, the malware detection service may identify the malware server as a target of inquiry (herein identified respectively as a source 18 and a target 12), and may send a request to the target 12 for a resource that, when sent by other nodes 14, may have triggered the distribution of malware from the target 12. However, the target 12 may be configured to evade detection by malware detection services by providing benign content to such services. For example, the target 12 may, upon receiving a request from a source 18 of a request, perform a domain name service (DNS) lookup of the network address of the source 18 and determine whether the DNS entry for the network address includes the domain name of a known malware detection service). Upon receiving a request from a source 18 having a matching network address, may respond to the request by providing a benign response 20 instead of the malware 16. Alternatively, the target 12 may perform a traceroute on the request 18, and may determine whether the route of the request originated from within the domain of a known malware detection service. In this manner, the target 12 may be configured to evade detection by responding to requests differently in view of the characteristics of the source 18 of the request.

In order to overcome such evasion techniques, a malware detection service may utilize a proxy network to distribute requests to a target 12 from a set of proxies that are not identifiably associated with the domain of the malware detection service. For example, a source 18 of network traffic may establish a proxy network 32 comprising a set of nodes 14 that are configured to transmit traffic to various network targets 12 on behalf of the source 18. The source 18 may interact with a target 12 by sending a request to one or more of the proxy nodes 14, which may send the request to the target 12 without exposing the source 18. The target 12 may therefore identify the sources of the request as the nodes 14 with which the target 12 is interacting, rather than the source 18 that initiated the request. However, these techniques may also be vulnerable to evasion. For example, a malware provider may identify the nodes 14 that belong to a particular source 18 (e.g., the proxies that a malware detection service often utilizes to access malware servers). Such information may be acquired from other malware servers and/or derived from interactions of the source 18 with the target 12 (e.g., a blacklisting of the network address of a target 12 shortly after the target 12 is contacted by a particular node 14 that is likely associated with the source 18). The target 12 may therefore evade detection by inferring the proxy relationship between the source 18 and the node 14 (e.g., by inferring that any nodes 14 within a particular block of network addresses may be operated by the source 18), and may respond to requests received from any such nodes 14 with benign content, while continuing to send malware 16 to nodes 14 that are not associated with the source 18. In this manner, the proxying service may not fully overcome the evasion of the malware detection service. Moreover, the effectiveness of the proxying service may degrade over time if nodes 14 are consistently used by a source 18, thereby establishing a pattern implying an association between a node 14 and the source 18.

Figure 2:
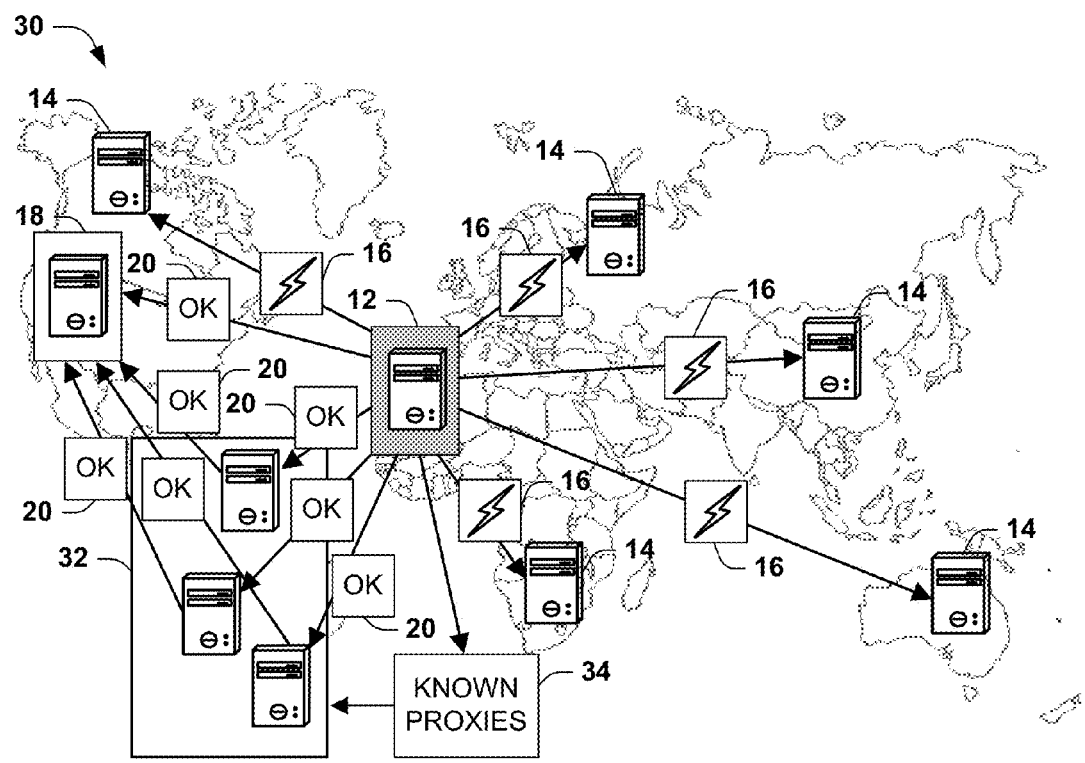
FIG. 2 is an illustration of an exemplary scenario featuring a provision of malware from a malware source to a set of requesting devices in a manner that evades provision of the malware to a particular source and the proxies associated with the source.

FIG. 2 presents an illustration of an exemplary scenario 30 featuring a proxy network 32 of nodes 14 having an association with a source 18 (e.g., a malware detection service) and the configuration of the target 12 to evade detection by the source 18 of the distribution of malware 16. In this exemplary scenario 30, a target 12 distributes malware 16 to a set of nodes 14, and a source 18 identifying the target 12 as potentially suspicious may endeavor to interact with the target 12 in order to evaluate its behavior. However, instead of interacting directly with the target 12, the source 18 may establish a proxy network 32, comprising a set of nodes 14 outside of the domain of the source 18 and not having a readily identifiable association. The source 18 may therefore interact with the target 12 via a node 14 of the proxy network 32, e.g., by requesting a node 14 of the proxy network 32 to send traffic (e.g., a request for a resource identified by a particular uniform resource identifier (URI)) to the target 12. Initially, the proxy network 32 may enable the source 18 to explore targets 12 in a pseudonymous manner. However, continued use of the proxy network 32 may lead to an identification by various targets 12 of the relationship with the source 18 (e.g., a pattern of behavior established by the source 18 of blacklisting targets 12 promptly after one of the nodes 14 of the proxy network 32 contacts a target 12). As the association becomes more well-known, an increasing number of targets 12 may identify requests received from one or more nodes 14 of the proxy network 32 as having been initiated by the source 18, and may establish a blacklist 34 of known or suspected proxies of one or more sources 18. In this manner, the effectiveness of proxies of a source 18 may degrade over time, and the establishment of a new set of proxies may be desirable.

Additional disadvantages may arise from various types of proxy networks 32, including the exemplary scenario 20 of FIG. 2. As a first example, it may be desirable to vary the configuration and/or behavior of the proxies (e.g., targets 12 may begin to identify a consistent set of behavior utilized by any proxy of a source 18, such as a particular software configuration or pattern of "crawling" behavior). However, the proxy service may not have been designed to support such flexibility, and it may be difficult to alter the number, locations, configuration, and/or behavior of the nodes 14 of the proxy network 32. Additionally, it may be desirable to use the proxy network 32 on behalf of a variety of sources 18 (e.g., different types of services, including a malware detection service, a search engine crawler, and a network performance monitoring service). However, such flexibility may involve additional variations of the proxy network 32 to send various types of traffic from a variety of nodes 14 to a variety of targets 12, and the architecture of many proxy networks 32 may have difficulty adapting to provide such flexibility.

A second exemplary disadvantage of many proxy networks 32 relates to limitations in the scalability of the proxy network 32 to include a large number of nodes 14 and/or sources 18. For example, in a centrally administrated proxy network 32, an administrating node may be configured to match all requests for traffic with one or more nodes 14. However, the administrating node may have difficult scaling up to handle the additional matching resulting from the addition of sources 18, nodes 14, and/or targets 12. Conversely, in a decentralized proxy network 32, each source 18 may contact peer nodes with requests to send a particular request 14. However, decentralized proxy networks 32 often exhibit load balancing inefficiencies (e.g., well-connected nodes 14 of the proxy network 32 receive more requests, and therefore carry a greater share of the network capacity load, than nodes 14 that are not well-connected), and it may be inefficient for a server 18 to locate a set of nodes 14 that are suitable for fulfilling a request to send traffic to a particular target 12.

A third exemplary disadvantage of many proxy networks 32 relates to the limited capability or inability of a source 18 to select a particular node 14 to transmit a particular traffic request to a target 12. For example, in a malware detection scenario, a source 18 may determine that a target 12 interacts differently with a node 14 of a first type than with a node 14 of a second type, such as nodes 14 exposing different operating systems or application platforms, having different sets of hardware (e.g., differing amounts of bandwidth), and/or located in different geographic regions. Therefore, a source 18 may not only generate a request to send traffic to a particular target 12, but may specify particular node properties of the nodes 14 through which such traffic is to be sent, and/or properties of the type of traffic delivered to the target 12 (e.g., a particular rate or total volume of the traffic). However, many proxy networks 32 are not configured to enable such specification by the source 18, nor to match the source 18 with nodes 14 having the specified node properties. Rather, the proxy network 32 may ensure that the traffic is sent to the target 14 from some nodes 14, but not from nodes 14 of a particular type. Indeed, in some scenarios, the proxy network 32 may promote the anonymity of the nodes 14 from each other and the source 18, and vice versa. For example, an anonymizing proxy network 32 may promote the anonymity of the nodes 14 from each other in order to ensure the trust instilled in sources 18 of data sent over the proxy network 32, as well as the participation of other nodes 14 that are not selectively targetable by a source 18 (e.g., to obstruct attempts to discover the size and identities of participants in the proxy network 32). In many other scenarios, the proxy network 32 may not enable a source 18 to be selective of the nodes 14 used to send a network request, simply because the source 18 may not be interested in such capabilities; e.g., the source 18 may seek to ensure that the request is sent to the target 12, but may not be interested in the identities or properties of the nodes 14 selected as proxies for the request. Thus, these proxy networks 32 may not be configured to support selective proxying in this manner, due to lack of interest and/or conflicting interests in the usage scenarios of the proxy network 32 (such as anonymity). These and other exemplary disadvantages may pertain to a variety of proxy networks 32 through which the delivery of traffic to a target 18 may be requested.

B. Presented Techniques

Presented herein are techniques for devising and generating a proxy network 32 that may reduce these and other disadvantage of other types of proxy networks 32. In accordance with these techniques, a proxy network 32 may be organized as a set of node managers that each manages a set of nodes 14 having various node properties. A node manager may detect the node properties of the nodes 14, such as a device type, an operating environment, a software configuration, a network connection type, an available network and/or processing capacity, and a geographic location of the device, and may store a set of node descriptors describing the node properties of the nodes 14. Additionally, a source 18 that seeks to have traffic sent to a target 12 may identify one or more selected node properties, and may generate and send to the node managers a target request that identifies the target 12 and at least one node property of the nodes 14 to be used as proxies in sending the traffic to the target 12. A source 18 may also specify other details in the target request (e.g., the type of traffic to be sent, one or more traffic properties relating to the volume and shape of the traffic to be sent to the target 12 by the nodes 14, and a request to be notified of the results of the traffic sent to the target 12). The target request may then be sent to node managers that manage the types of nodes 14 having the specified node properties. The target request may be translated into a traffic request (e.g., a request to a node manager to instruct nodes 14 having the selected node properties to send traffic to the requested target 12). The traffic request may be generated, e.g., by a proxy network manager that is configured to store information about the node properties of the nodes 14 managed by respective node managers, and that may serve as a front end for receiving target requests from respective sources 18 to be delivered to the nodes 14 through the node managers. Upon receiving the traffic request, the node managers may select nodes 14 having the node properties specified in the traffic request, and may instruct the selected nodes 14 to send the traffic to the target 12.

Figure 3:
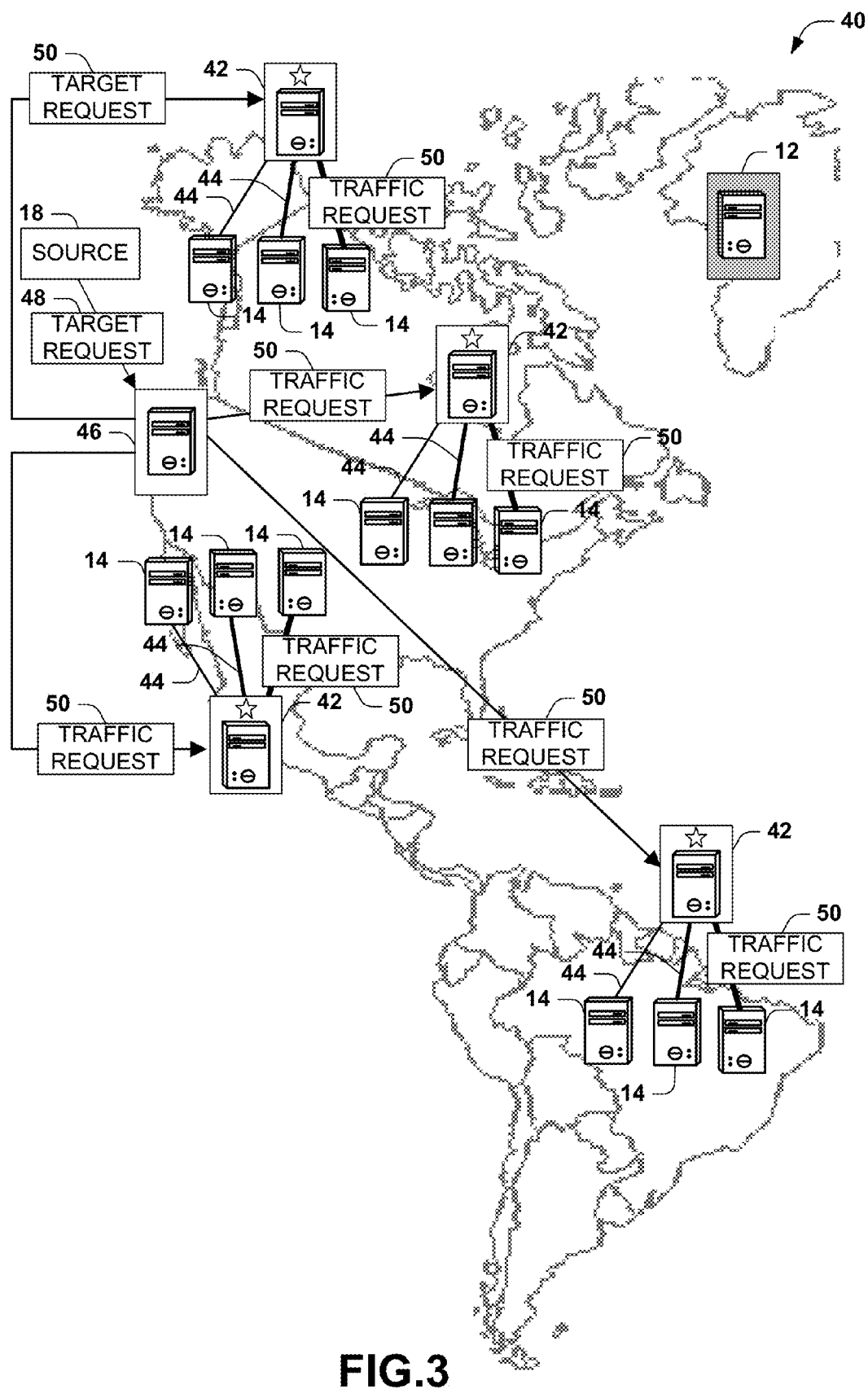
FIG. 3 is an illustration of an exemplary scenario featuring a proxy network configured to send traffic from a source to a target through a set of nodes having particular node properties in accordance with the techniques presented herein.
Figure 4:
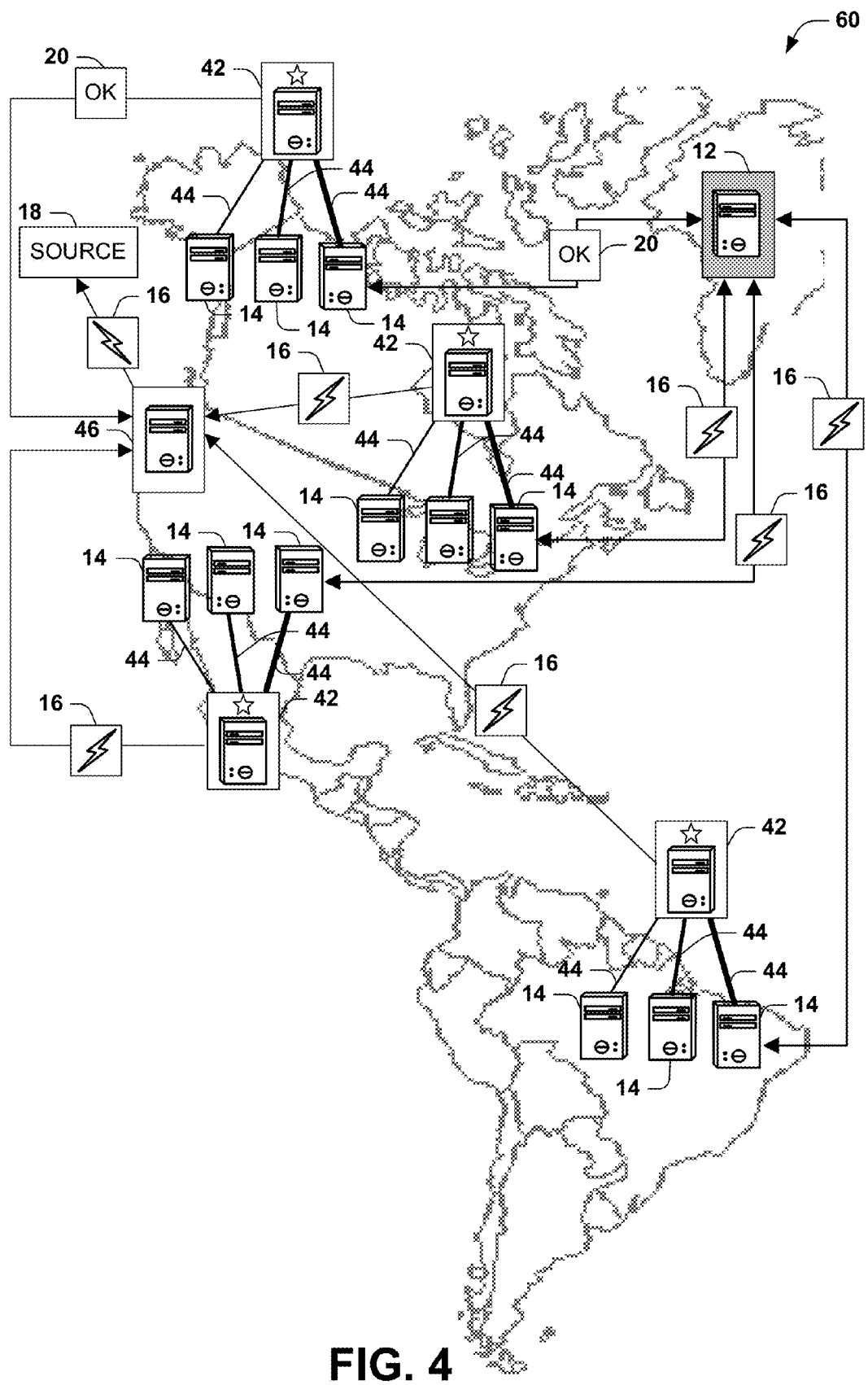
FIG. 4 is an illustration of an exemplary scenario featuring a delivery of a result of traffic between a target and a set of selected nodes of a proxy network to a source requesting the traffic in accordance with the techniques presented herein.

FIGS. 3-4 together present an exemplary scenario featuring the sending of traffic to a target node 12 through a proxy network 32 in accordance with the techniques presented herein. In the exemplary scenario 32 of FIG. 3, a proxy network may be devised comprising a set of nodes 14 that are respectively managed by a node manager 42. The association of nodes 14 and node managers 42 may based on shared properties, e.g., a geographic proximity of the nodes 14 and the node manager 42, a shared hardware ownership and/or administration (e.g., a particular owner and/or administrator of both the node manager 42 and the nodes 14), and/or a network topology (e.g., nodes 14 connected to the internet through a particular uplink), and/or may be arbitrarily assigned. The node managers 42 may be configured to instruct nodes 14 to send traffic to respective targets 12. Additionally, the node managers 42 may be configured to communicate with a proxy network manager 46, e.g., a front end for the proxy network 32. Moreover, respective nodes 14 may inform the network managers 42 of one or more node properties 44 (e.g., a hardware or software configuration, available network capacity, and a connection type), and the network managers 42 may send to the proxy network manager 46 a set of node descriptors that describe the node properties 44 of the nodes 14 managed by the network managers 42 (e.g., in the aggregate, such as "this network manager manages nodes having a cable modem connection through a particular internet service provider (ISP)," or the specific node properties 44 of respective nodes 14). In this exemplary scenario 40, a variable node property 44 comprising network capacity availability (e.g., bandwidth) is depicted according to the thickness of the lines connecting respective nodes 14 with a node manager 42, such as a thick line representing abundant available network capacity and a thin line presenting limited available network capacity.

As further depicted in the exemplary scenario 40 of FIG. 3, the proxy network manager 46 may also communicate with one or more sources 18 to receive target requests 48 comprising a request to send traffic to a particular target 12. A source 18 may specify in the target request 48 one or more node properties 44 of the nodes 14 to be used to send the traffic to the target 12. A proxy network manager 46 may perform a matchmaking of the node properties 44 specified in the target request 48 with the node properties 44 of the nodes 14 managed by respective node managers 42 (e.g., by comparing the target request 48 with the node properties 44 specified in the node descriptors received from the node managers 42 that describe the node properties 44 of nodes 14 managed by the respective node managers 42). The proxy network manager 46 may therefore select one or more node managers 42 managing nodes 14 having the selected node properties 44, and may send to selected node managers 42 a traffic request 50, comprising a request to instruct nodes 14 having the node properties 44 specified in the target request 48 to send traffic to the target 12. For example, as depicted in this exemplary scenario 40, the target request 48 may indicate that traffic is to be sent to the target 12 using nodes 42 having the node property 44 of abundant available network capacity 44. The node managers 42 may receive the traffic request 50 and select nodes 14 having the specified node property 44, and may instruct the selected nodes 50 to send traffic to the target 12 (e.g., by forwarding the traffic request 50 to the selected nodes 14). In this manner, the proxy network manager 46 may propagate the target request 48 to a selected set of nodes 14 of the proxy network 32.

FIG. 4 presents an illustration of an exemplary scenario 60 featuring the use of the selected nodes 14 to send traffic to the target 12. In this exemplary scenario 60, the selected nodes 14 having abundant available network capacity have been instructed to send traffic to the target 12, and may generate and send the specified traffic to the target 12 (e.g., by sending a hypertext transfer protocol (HTTP) request requesting a particular uniform resource identifier (URI) of a particular resource to the target 12). In some scenarios, the currently presented techniques may end here; e.g., the source 18 may simply be interested in sending the specified traffic to the target 12, and may not be interested in a result of the sending of the traffic. However, in other scenarios (including the exemplary scenario 60 of FIG. 4), the proxy network 32 may inform the source 18 of the results of the traffic sent from the selected nodes 14. For example, in response to the traffic, the target 12 may respond in various ways, e.g., to some nodes 14 that the target 12 suspects of having an association with the source 18, the target 12 may send a benign response 20, but to other nodes 14, the target 12 may send malware 16. Alternatively or additionally, the target 12 may perform an action that may be detectable by the selected nodes 14 (e.g., a change in behavior, such as initiating or terminating a service). The selected nodes 14 may receive the responses from the target 12 and may inform the respective node managers 42 of the results. The node managers 42, in turn, may forward the results to the proxy network manager 46, which may inform the source 18 of the results (e.g., forwarding the malware 16 sent by the target 12 to some of the nodes 14). In this manner, the nodes 14, node managers 42, and proxy network manager 46 may interoperate to fulfill the target request 48 received from the source 18.

The techniques illustrated in the exemplary scenarios of FIGS. 3-4 may present some advantages over other architectures and uses of proxy networks 32. As a first exemplary advantage, the techniques presented herein facilitate the selectivity of the traffic sent by the proxy network 32 to the target 12 through the specification and use of node properties 44 of the nodes 14 selected for sending the traffic. As a second exemplary advantage, the architecture of the proxy network 14 as a proxy network manager 46 interoperating with a set of node managers 42 that respectively manage a set of nodes 14 may enable efficient matchmaking of a target request 48 (specifying particular node properties 44) with nodes 14 having the specified node properties 44, which may be less efficiently achieved in decentralized proxy networks 32. As a third exemplary advantage, this architecture may avoid the scalability difficulties that often arise in centrally managed proxy networks 32 by utilizing node managers 42 to communicate with respective sets of nodes 14, rather than having the proxy network manager 46 directly manage the nodes 14. As a fourth exemplary advantage, by abstracting the matchmaking and targeting services of the proxy network 32, this architecture may promote various aspects of scalability of the size and variety of the proxy network 32. For example, a large number of nodes 14 may be added to the proxy network 32 by providing an additional node manager 42, thereby reducing the scaling burden on the proxy network manager 46. Moreover, the variety of nodes 14 may be expanded by implementing a node manager 42 that is specialized for the new type of node 14 (e.g., in addition to high-bandwidth nodes 14 managed by a node manager 42 provided by an internet service provider, nodes 14 connected to a cellular network may be provided and managed by a node manager 42 operated by a cellular network provider, thereby providing a different type of node 14). The expanded variety of nodes 44 available in the proxy network 32 may simply be added as a new node property 44 that may be may be exposed by the node managers 42 and specified in target requests 46. Additionally, the architecture of the proxy network 32 may accommodate a potentially large number and wide variety of sources 18 requesting various types of traffic to be sent to various types of targets 12, as well as a variety of traffic types, since the protocol-agnostic architecture may enable target requests 48 to specify many protocols (e.g., FTP, HTTP, or HTTPS). As a fifth exemplary advantage, because the flexible architecture is not tightly bound to a particular set or type of nodes 14, the proxy network 32 may exclude nodes 14 for which an association with the source 18 has been inferred by a target 12, and may be rapidly replaced with new nodes 14 for which an association with the source 18 is not suspected. This abstraction also promotes the anonymity of the proxy network 32; e.g., the nodes 14 are distanced from and do not communicate with either the proxy network manager 46 or any source 18, and therefore promote the untraceability of the traffic generated therefrom back to the proxy network manager 46 and/or the source 18. These and other advantages over alternative types of proxy networks 32 may be achievable through the use of the techniques presented herein.

C. Exemplary Embodiments

Figure 5:
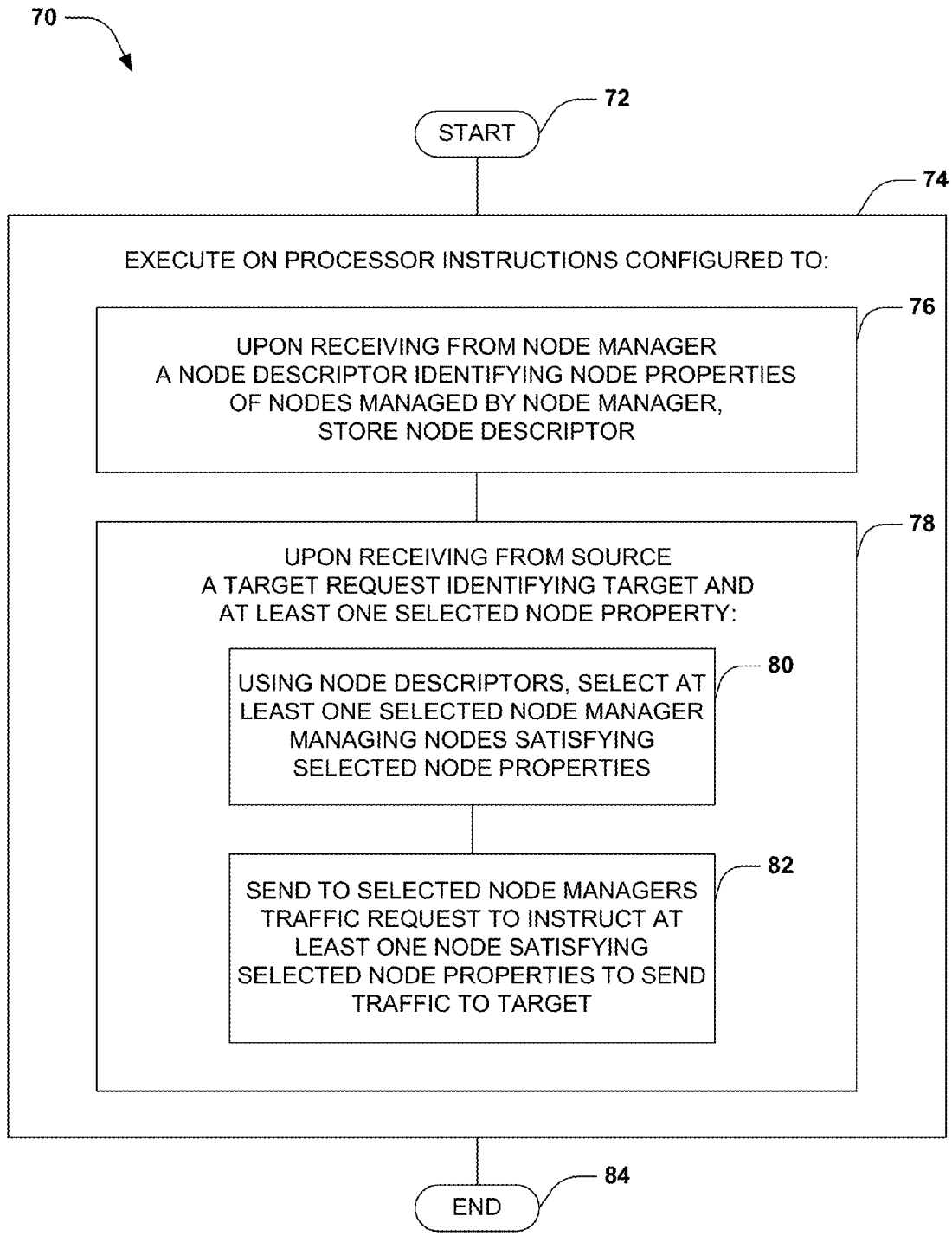
FIG. 5 is a flowchart illustrating an exemplary method of sending traffic on behalf of sources to targets using node managers managing nodes having node properties in accordance with the techniques presented herein.

FIG. 5 presents a first exemplary embodiment of these techniques, illustrated as an exemplary method 70 of sending traffic on behalf of sources 18 to targets 12 using node managers 42 managing nodes 14 having node properties 44. The exemplary method 70 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 70 begins at 72 and involves executing 74 the instructions on the processor. Specifically, the instructions are configured to, upon receiving from a node manager 42 a node descriptor identifying node properties 44 of nodes 14 managed by the node manager 42, store 76 the node descriptor. The instructions are also configured to, upon receiving 78 from a source 18 a target request 48 identifying a target 12 and at least one selected node property 44, using the node descriptors, select 80 at least one selected node manager 42 managing nodes 14 satisfying the selected node properties 44, and send 82 to the selected node managers 42 a traffic request 50 to instruct at least one node 14 satisfying the selected node properties 44 to send traffic to the target 12. In this manner, a device (such as a proxy network manager 46) may fulfill a target request 48 of a source 18 by instructing nodes 14 having the selected node properties 44 to send traffic to the target 12, and so ends at 84.

Figure 6:
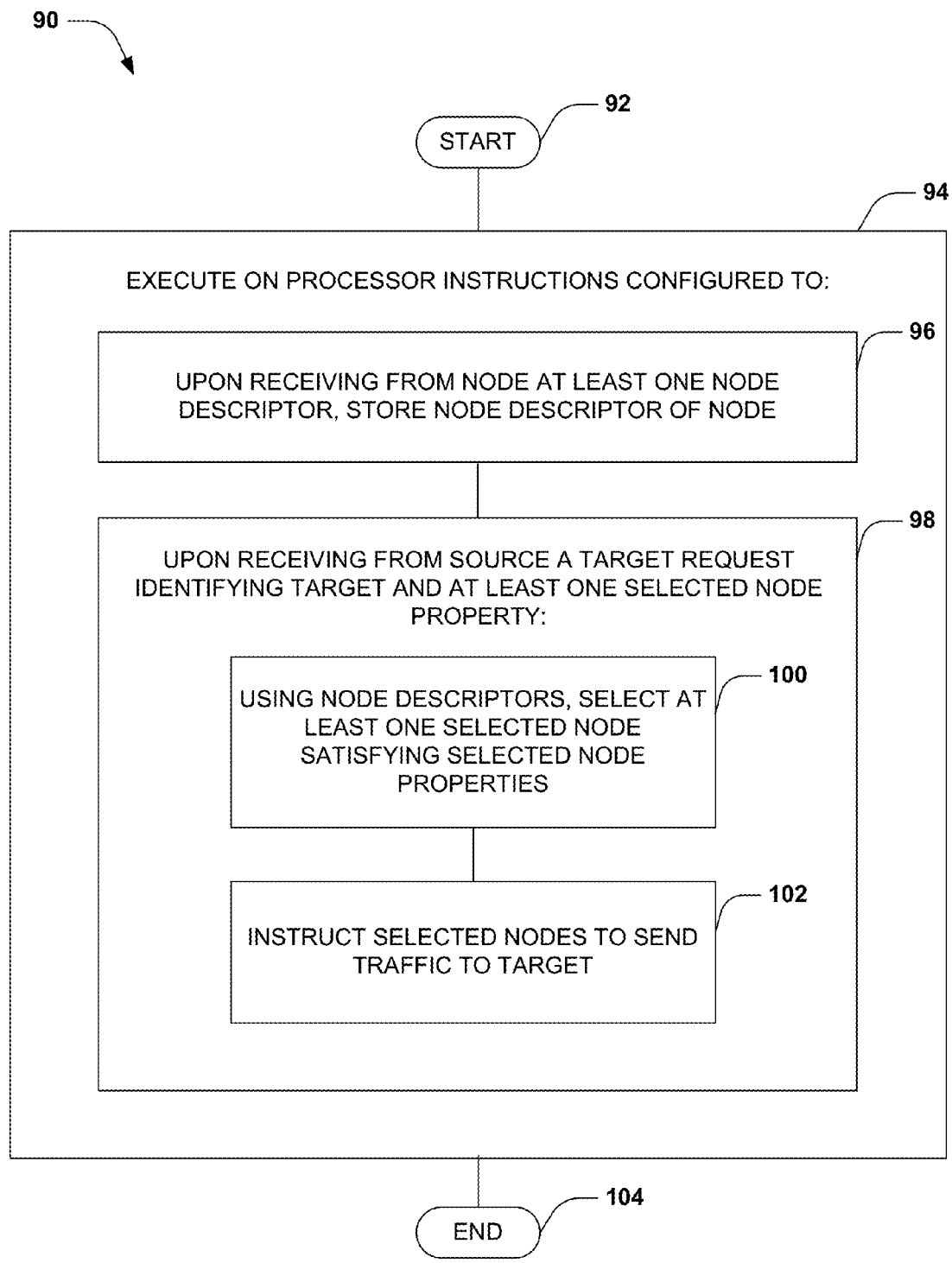
FIG. 6 is a flowchart illustrating an exemplary method of instructing nodes to send traffic to at least one target on behalf of at least one source in accordance with the techniques presented herein.

FIG. 6 presents a second exemplary embodiment of these techniques, illustrated as an exemplary method 90 of instructing nodes 14 of a proxy network 32 to send traffic to at least one target 12 on behalf of at least one source 18. The exemplary method 90 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 90 begins at 92 and involves executing 94 the instructions on the processor. Specifically, the instructions are configured to, upon receiving from a node 14 at least one node descriptor, store 96 the node descriptor of the node 14. The instructions are also configured to, upon receiving 98 from a source 18 a target request 48 identifying a target 12 and at least one selected node property 44, using the node descriptors, select 100 at least one selected node 14 satisfying the selected node properties 44; and instruct 102 the selected nodes 14 to send traffic to the target 12. In this manner, the exemplary method 90 achieves the delivery of traffic to a target 12 on behalf of a source 18 through nodes 14 having the node properties 44 specified in the target request 48 of the source 18, and so ends at 104.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
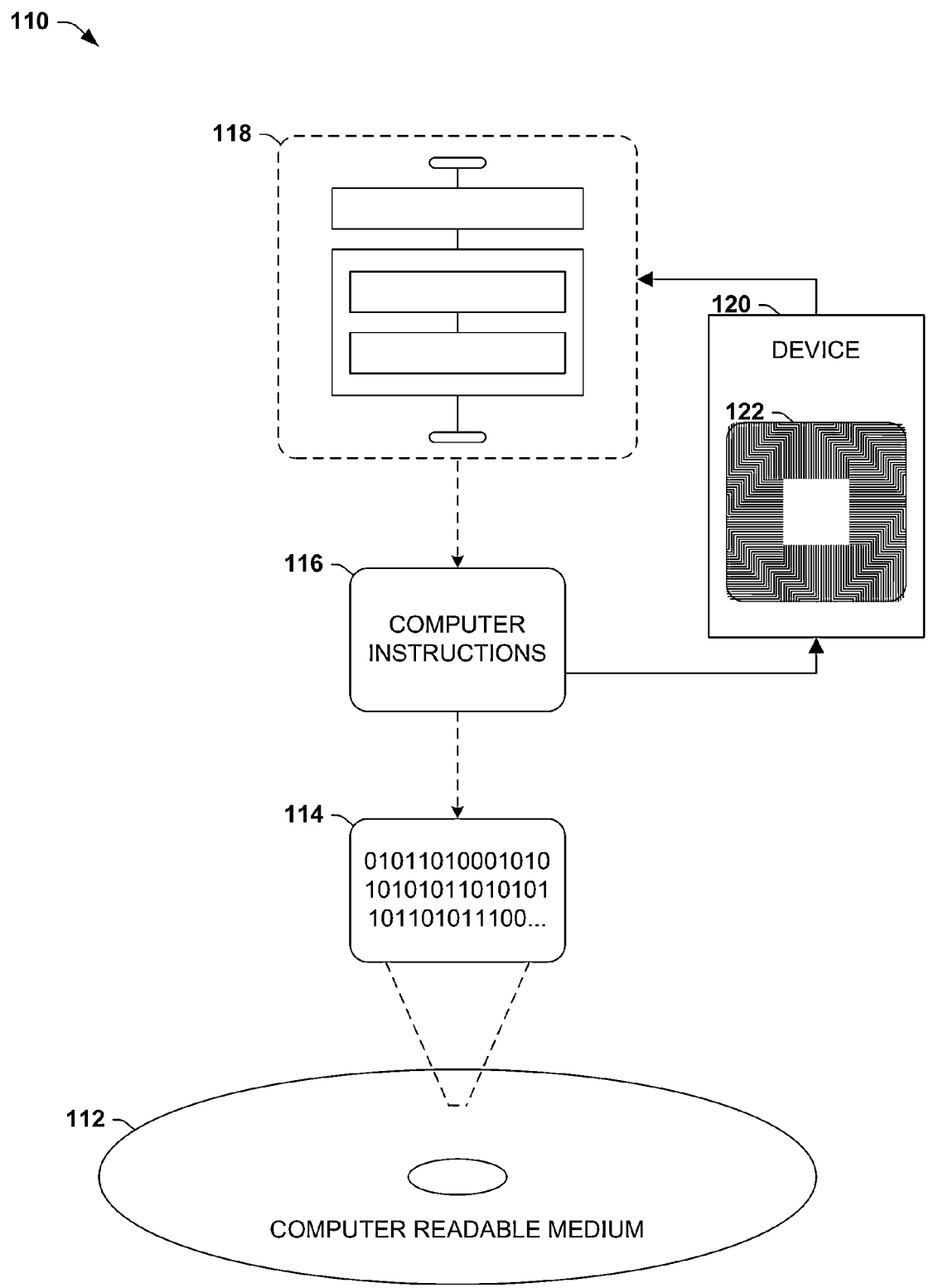
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to, when executed by a processor 122 of a device 120, cause the device 120 to operate according to the principles set forth herein. In one such embodiment, the processor-executable instructions 116 may be configured to perform a method of sending traffic on behalf of sources 18 to targets 12 using node managers 42 managing nodes 14 having node properties 44, such as the exemplary method 70 of FIG. 5. In another such embodiment, the processor-executable instructions 116 may be configured to implement a method of instructing nodes 14 to send traffic to at least one target 12 on behalf of at least one source 18, such as the exemplary method 90 of FIG. 6. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations in Aspects

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 5 and the exemplary method 90 of FIG. 6) to confer individual and/or synergistic advantages upon such embodiments.

D1. Scenarios

A first aspect that may vary among embodiments of these techniques relates to the scenarios wherein these techniques may be utilized. As a first variation of this first aspect, these techniques may be used with many types of public and private proxy networks 32, such as virtual private networks configured to enable a device in an untrusted environment to have traffic sent from a trusted environment; an anonymizing proxy network configured to allow a node 14 to send traffic through another node 14 in order to anonymize the source of the traffic 14; and a crawler network configured to distribute interactions with a target 12 of an examination among a set of nodes 14 in order to disguise the crawling as legitimate traffic. Other examples of proxy networks 32 that may advantageously utilize these techniques include a proxy-based file-sharing network that is configured to enable high-bandwidth nodes 14 to retrieve data that may be redistributed to one or more lower-bandwidth nodes 14; a server farm proxy network 32, such as a content source that is configured to fulfill a large volume of requests by distributing the evaluation (and computational burden) of such requests across a set of nodes 14; a usage simulation service configured to generate simulated traffic utilizing a service from various types of nodes 14 as a load-testing simulation; an ad hoc wireless proxy network comprising a set of nodes 14 configured to self-organize into a network that may tolerate and adjust for network interruptions; and a distributed denial of service (DDoS) proxy network that is configured to overload a server or service with unproductive network requests sent from a variety of nodes 14. While these proxy networks 32 may be used maliciously (e.g., a DDoS attack against a legitimate data source in order to interfere with the distribution of data, or an anonymizing network configured to send copyrighted content), these proxy networks 32 may also be used in acceptable ways (e.g., a DDoS attack against a malware server in order to interfere with the distribution of malware, or an anonymizing network configured to enable anonymous reporting of observed events). Such proxy networks 32 may also be private (e.g., only admitting devices operated by subscribers or the members of an organization) or public (e.g., allowing any type of device to join the proxy network 32), and may involve various levels of security (e.g., an anonymizing network may nevertheless only enable nodes 14 to join a proxy network 32 and request other nodes 14 to send anonymized data only after authenticating an identity of the device and/or user with a centralized administrating node).

As a second variation of this first aspect, these techniques may be used to distribute traffic sent from various types of nodes 14 comprising the proxy network 32. While such nodes 14 generally comprise network end points that are able to communicate with the target 12 (e.g., directly or through intermediate nodes 12 of the network), the nodes 14 may comprise many types of devices. As a first example, one or more nodes 14 of the proxy network 32 may comprise user-operated network devices, such as workstations, notebooks, netbooks, tablets, mobile communications devices, portable media players, and internet appliances. These types of nodes 14 may ordinarily be utilized to service requests from a user, but may be configured to utilize spare computing resources (e.g., spare network and processing capacity) as part of a proxy network 32. As a second such example, one or more nodes 14 may comprise unattended computing devices, such as servers that are partly or wholly dedicated to participation in the proxy network 32. As a third such example, one or more nodes 14 may comprise networking hardware. For example, the nodes 14 may comprise routers connected to the internet that may not initiate any types of request, but may be configured to receive and retransmit traffic on behalf of various sources 18. For example, an internet service provider (ISP) may utilize available network capacity by configuring a set of networking hardware components (e.g., routers) to enroll in a proxy network 32 and accept and fulfill requests to transmit traffic on behalf of various sources. As a fourth such example, one or more nodes 14 may comprise a process executing on a device, e.g., a network relay process executing on a computer. The proxy network 32 may also include a variety of such devices (e.g., devices presenting a variety of node properties 44).

As a third variation of this first aspect, the proxy networks 32 presented herein may be used to send traffic to many types of targets 12. As a first such example, the targets 12 may comprise servers, services, devices, and network domains representing various organizations, service providers, or geographic areas. As a second such example, the targets 12 may or may not be informed of the existence of the proxy network 32 (e.g., the exemplary scenario depicted in FIGS. 3-4 demonstrates a covert use of a proxy network 32 to send traffic to a target 12 from a variety of nodes 14 that appear to have been independently initiated; by contrast, the nodes 14 of a server farm may inform the target 12 of the existence and nature in order to demonstrate the capabilities of the proxy network 32 to fulfill requests).

As a fourth variation of this first aspect, the proxy network 32 may generate and send traffic to the target 12 on behalf of many types of sources 18. For example, respective sources 18 may comprise a user initiating the request for traffic to a target 12, or on behalf of a partly or wholly automated process (e.g., a network crawler configured to explore and catalog the resources of a particular network, such as a local area network, or a web crawler configured to retrieve and index web-accessible content that may be located through a search engine). The sources 18 may also be anonymous, and/or may be authenticated with permission to send requests to the proxy network 32. (It may be appreciated that these options are not contradictory; e.g., an anonymous source 18 may be authenticated using a private key that verifies permission to use the proxy network 32, or may be authorized in a non-identifying manner by an access control list.) The sources 18 may also request traffic to be sent to the target 12 in many contexts, e.g., in order to receive and evaluate responses and content distributed by the target 12; in order to establish a trust rating of the target 12; in order to distribute the computing burden of the traffic over a set of nodes 14; in order to send traffic to the target 12 from a variety of nodes 14, and/or from a node 14 that is difficult to trace back to the source 18; and/or in order to evaluate the responses of the target 12 to interactions with different types of nodes 14.

As a fifth variation of this first aspect, the proxy network 32 may generate various types of traffic (e.g., web requests for content or resources specified according to a uniform resource identifier (URI); file requests specified through a file transfer protocol, such as FTP or WebDAV; messages exchanges over a chat protocol; and streaming media requests to stream various types of media, such as video or audio, between the node 14 and the target 12). As another example of this fifth variation, the traffic may be sent in response to a request received from the target 12 (e.g., a server farm proxy network 32); may be spontaneously sent by the source 18 to the target 12, but with the consent of the target 12 (e.g., a load-testing simulation service); and/or may be spontaneously sent by the source 18 and may be undesirable to the target 12 (e.g., in a distributed-denial-of-service (DDoS) proxy network 32).

As a sixth variation of this first aspect, various types of node properties 44 may reported by and/or detected for various nodes 14 of the proxy network 32. An exemplary node property set may include such node properties 44 as a geographical location node property (e.g., nodes 14 located in a particular geographic area); a network carrier node property (e.g., the identity or type of an internet service provider connecting the node 14 to the proxy network 32); a network uplink connection type node property (e.g., a particular type of connection, such as a fiber optic connection, a digital subscriber line (DSL) connection, a cable modem connection, or a cellular connection); a network address node property (e.g., the identity or domain name of the network address); a network domain node property (e.g., the domain name of a block of addresses including the network address of the node 14, or the identities of other nodes 14 included in the network path to and from the node 14); and a device type node property (e.g., the type of device operating as a node 14 in the proxy network 32, such as a workstation, server, notebook, tablet, mobile phone, or network routing component).

As a seventh variation of this first aspect, many variations may be introduced in the architecture of an embodiment of these techniques that may not significantly alter the application of the techniques presented herein. As a first such example, the node properties 44 of respective nodes 14 may be reported by the nodes 14 to the node manager 42, or may be detected by a node manager 42 (e.g., by monitoring the volume and types of communications sent and received by the node 14 to identify various node properties 44). As a second such example, a source 18 may also operate as a proxy network manager 46, or may exist as a separate device and/or process in communication with a proxy network manager 46. Some embodiments may not even include a proxy network manager 46; e.g., the node managers 42 may communicate directly with one or more sources 18. As a third such example, the node managers 42 may send node descriptors to the proxy network manager 46, which may store the node descriptors (in a volatile and/or non-volatile manner) and may later use the node descriptors to select node managers 42 to which a traffic request 50 may be sent. The node descriptors may describe particular nodes 14 or groups of nodes 14 (e.g., "this node manager manages two nodes having the following node properties"), or may describe nodes in an aggregate or general manner (e.g., "this node manager is configured to manage nodes having the following node properties," regardless of the number of nodes 14 actually having those node properties 44 that are currently managed by the node manager 42). Alternatively, the node managers 42 may simply store the node descriptors, and may use the node descriptors select particular nodes 14 in response to a traffic request 40 broadcast from a proxy network manager 46 or from a source 18. These and other variations in the architecture of a proxy network 32 and the configurations of nodes 14, node managers 42, proxy network managers 48, and sources 18 may be devised that nevertheless utilize the techniques presented herein. Those of ordinary skill in the art may devise many such scenarios and variations in embodiments wherein the techniques presented herein may be advantageously utilized.

D2. Variations in Target Requests and Traffic Requests

A second aspect that may vary among embodiments of these techniques relates to the nature of target requests 48 initiated by a source 18 to use the proxy network 32 to send traffic to a target 12 and the traffic requests 50 directing a particular node 14 to send traffic to the target 12 (including a request to a node manager 42 to select and instruct nodes 14 in this manner). As a first variation of this second aspect, a target request 48 and/or traffic request 50 may specify the target 12 in various ways, such as a network address, a uniform resource identifier (URI), a network domain or block of network addresses, a distinctive name, an identifier of a service offered by the target 12, or a profile of the target 12 in a profile directory. As a second variation of this second aspect, a target request 48 and/or traffic request 50 may specify the types of traffic to be sent to the target 12 in various ways, such as a particular communications protocol or service (e.g., sending web traffic as a set of web requests specified according to a hypertext transfer protocol (HTTP) or a set of file requests specified according to a file transfer protocol (FTP), a port range, or an amount or frequency of traffic to send to the target 12. Alternatively, a source 18 may not specify one or more node properties 44 in a target request 48 (e.g., may either specify some node properties 44 but not others, such as the device types of nodes 14 to be used but not the geographic regions of the nodes 14), and a proxy network manager 46 and/or node manager 42 may select a default node property for the unspecified node properties 44. For example, if the target request 48 does not specify a geographic region for the nodes 14 to be used, the proxy network manager 46 and/or node managers 42 may select a diverse set of geographically distributed nodes 14 as a default node property 44.

As a third variation of this second aspect, a target request 48 may specify the node properties 44 of nodes 14 of the proxy network 32 from which traffic is to be sent in various ways. As a first example, the node properties may specify the node properties 44 with varying levels of detail (e.g., "ten nodes having a DSL connection and ten nodes having a cable modem connection," or "twenty nodes capable of transmitting traffic at a particular data rate"). More generally, a target request 48 may specify a traffic property of the traffic to be sent to the target 12 from the proxy network 32. Each node manager 42 may select nodes 14 that, together with the other selected nodes 14 of the proxy network 32 (managed by the node manager 42 or other node managers 42), generate traffic that exhibits the specified traffic properties. Such traffic properties may be selected from a traffic property set including a traffic volume property (e.g., "select and instruct enough nodes 14 to send a particular volume of traffic to the target 12"); a traffic variance property among the nodes 14 sending the traffic to the target 12 (e.g., "select and instruct nodes 14 from a variety of geographic regions around the world"); and a traffic source anonymity property anonymizing the source 18 from the target 12 (e.g., "select and instruct nodes 14 that obscure the identity of the source 18 of the target request 48"). Conversely, in some scenarios, the traffic properties may include a traffic source identifying property specifying that the traffic generated by the nodes 14 identifies the source 18 to the target 12. As a first such example, this identification discreetly and selectively disclose the identity of the source 18 to the target 12 in a manner that is not detectable by eavesdroppers (e.g., sending portions of an identifier through each of the nodes 14 sending traffic to the target 12, such that only the target 12 may assemble the identifier). As a second such example, it may be advantageous to notify a target 12 that some traffic from a general set of nodes 14 is associated with the source 18. In order to evade detection by the source 18, a target may therefore have to treat a large set of traffic as potentially associate with the source 18, e.g., by not providing malware to a large set of nodes 14 including a few nodes 14, and potentially many others, that are associated with the source 18. Those of ordinary skill in the art may devise many ways of specifying a target request 48 and/or a traffic request 50 in accordance with the techniques presented herein.

D3. Variations in Node Selection and Instruction

A third aspect that may vary among embodiments of these techniques relates to the selection and instruction of nodes 14 to send traffic to the target 12 in fulfillment of the target request 12 and specified node properties 44. As a first variation of this fourth aspect, the selection of nodes 14 may be contingent upon validating the request to send the traffic. It may be appreciated that proxy networks 32 may comprise powerful computing and network resources that be utilized for both benign and nefarious ends, and that securing the access and use of the proxy network 32 may be desirable to reduce improper uses. For example, respective sources 18, proxy network managers 46, and node managers 42, may be authenticated before another component of the proxy network 32 propagates or acts upon a target request 48 or a traffic request 50. As one such example, upon receiving a target request 48 from a source 18, a proxy network manager 46 or node manager 42 may be configured to authenticate the source 18 of the target request 48 (e.g., using a certificate, access control list, or authentication credentials such as a password or signature) before instructing selected nodes 14 to send traffic to the target 12.

As a second variation of this third aspect, a proxy network manager 46 and/or node managers 42 may utilize load-balancing techniques to allocate and distribute the computational burdens of traffic requests 50 across the proxy network 32. As a first example, respective node managers 42 may be configured to report to a proxy network manager 46 a traffic load of the traffic sent from the nodes 14 managed by the node manager 42 to at least one target 14, and the proxy network manager 46 may use this reported information while selecting node managers 42 for subsequent traffic requests 48 in order to balance the traffic sent to one or more targets 12 from the nodes 14 managed by the node managers 42, thus avoiding an overloading of the nodes 14 managed by a first node manager 42 while underutilizing the nodes 14 managed by a second node manager 42. Alternatively or additionally, a node manager 42 may be configured to monitor a traffic load of respective monitored nodes 14 while sending traffic to one or more targets 12, and while selecting nodes 14 to satisfy future traffic requests 50, may consider the traffic loads of the monitored nodes 14 in order to distribute the computational burden of sending traffic to the targets 12 across the managed nodes 14 in a balanced manner.

As a third variation of this third aspect, a node manager 42 may instruct nodes 14 to send traffic to the target 12 in a manner that obscures a relationship of the nodes 14 with the source 18, with the proxy network manager 46, with the node manager 42, and/or with other nodes 14 of the proxy network 32. For example, a target 12 may detect commonalities shared by respective nodes 14 that imply an association (e.g., coincident commencement and/or cessation of traffic, similar characteristics of traffic received from several nodes 14, or related identifiers that distinguish the nodes 14 from unrelated nodes 14 sending traffic to the target 12. Such discovery may enable a target 12 to treat the nodes 14 of the proxy network 32 differently from other nodes 14 (e.g., selectively withholding malware from the nodes 14 of the proxy network 32), thereby reducing the effectiveness of the proxy network 32 in examining the full range of behavior of the target 12. Therefore, the nodes 14 may be instructed to obscure any characteristics that may enable the discovery and identification of the nodes 14 comprising the proxy network 32. As one such example, the nodes 14 of the proxy network 32 may be joined in a particular domain or private network (e.g., a VPN), and may share a block of private addresses for private communication among the node 14. However, if the private network addresses of the nodes 14 are disclosed to a target 12 in the traffic, the target 12 may be able to detect the existence of the proxy network 32 and to identify the nodes 14 comprising the proxy network 32. Thus, a proxy network manager 46 and/or a proxy manager 42 may assign to respective nodes 14 a public network address, and may instruct the node 14 to use the public network address while communicating with the target 12, but to use the private network address while communicating with the other nodes 14 and the node manager 42. Alternatively, the node manager 42 may allow a node 14 to generate traffic using a private network address, but automatically may rewrite traffic between the node 14 and the target 12 to replace the private network address with the public address for outbound traffic, and vice versa for inbound traffic.

Figure 8:
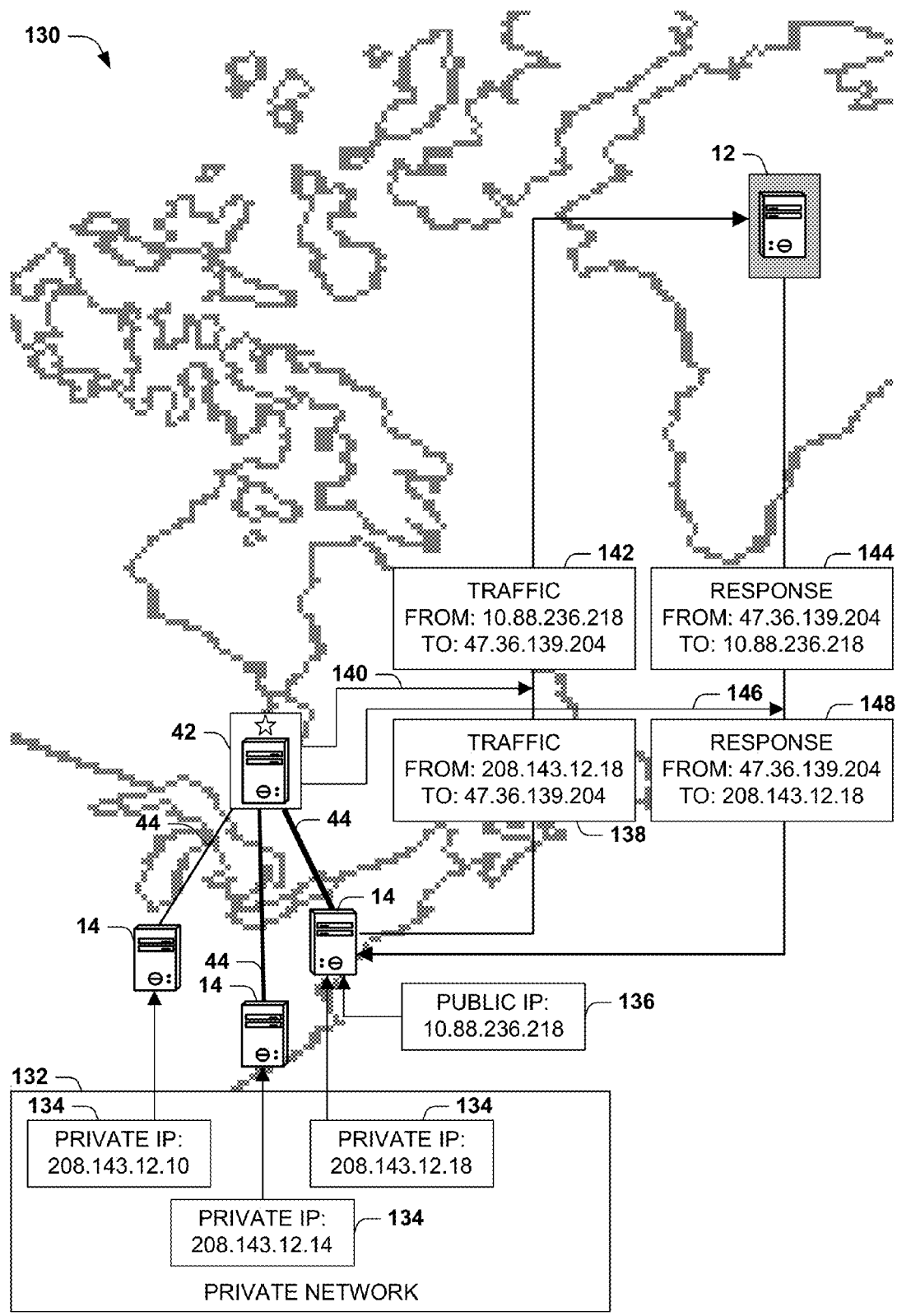
FIG. 8 is an illustration of an exemplary scenario featuring a grouping of nodes of a proxy network into a private network and the rewriting of traffic involving the nodes to obscure the including of the nodes in the private network.

FIG. 8 presents an illustration of an exemplary scenario 130 featuring an automated rewriting of traffic in order to obscure the association of a node 14 with a proxy network 32. In this exemplary scenario 130, a node manager 42 is configured to manage a set of nodes 14 comprising a proxy network 32 in a particular geographic region. The nodes 14 may be configured as a private network 132, such as a local area network or a virtual private network, in order to facilitate the intercommunication of the nodes 14 and the communication with the node manager 42. To this end, the nodes 14 may be assigned a private network address 134 within a block of network addresses assigned to the private network 132. The node manager 42 may receive (e.g., from a source 12 or a proxy network manager 46) a traffic request 50 to select nodes 14 having particular node properties 44, and to instruct the selected nodes 14 to send traffic to a target 12. However, if the nodes 14 communicate with the target 12 using the private network addresses 134, the target 12 may be able to infer the existence of the proxy network 32 and the associations of the nodes 14 with the proxy network 32, and may therefore interact with the nodes 14 of the proxy network 32 in a benign manner (while continuing to deliver malware to other nodes 14). Moreover, this detection may inadvertently compromise the effectiveness not only of the interacting node 14, but with other nodes 14 that have not yet interacted with the target 12, but that exhibit similarities with the detected node 14 (e.g., nodes 14 having a private network address 134 within the block of private network addresses 134 that the target 12 has attributed to the source 18). Therefore, the node manager 42 may participate in the networking by rewriting the traffic between the target 12 and the node 14 to obscure the association. In particular, and as illustrated in the exemplary scenario 130 of FIG. 8, the node manager 42 may perform a first rewriting 140 of a request 138 sent from the node 14 to the target 12, e.g., by replacing the private network address 134 of the node 14 with a public network address 136. The public address 136 may be assigned to the node 14 for communications with the target 12 (or any target 12), or may be dynamically and temporarily associated with traffic generated by any node 14 of the proxy network 32. The first rewriting 140 may result in a modified request 142 that obscures the identity of the node 14. Additionally, when a response 144 is received from the target 12 that is sent to the public network address 136 written into the request 138, the node manager 42 may perform a second rewriting 146 that replaces the public network address 136 with the private network address 134 assigned to the node 14 that generated the traffic. The modified response 148 may then be returned to the node 134, and/or may be forwarded to the proxy network manager 46. These rewriting techniques may obscure the existence of the proxy network 32 and the inclusion of the node 14 without encumbering the node 14 with the complexity of an additional network address, and may be performed automatically and transparently to both the target 12 and the node 14.

As a fourth variation of this third aspect, a node manager 42 may instruct nodes 14 to send traffic to a target 12 through one or more intermediate services. As a first example, the nodes 14 may direct traffic to the target 12 through an anonymizing service, such as a Tor anonymizing proxy network, in order to further obscure the identities of the nodes 14 and relationships with other nodes 14. As a second example, the node 14 may direct traffic through an external monitoring service that monitors the flow of traffic generated by the nodes 14. This may be advantageous, e.g., for measuring traffic generated by the proxy network 32 in a manner that is comparatively transparent to the nodes 14 and/or the target 12 of the proxy network 32. As a third example, the node 14 may direct traffic through an encrypting service, which may handle the encryption and/or decryption of the traffic sent to the target 12. Many such intermediate services may be utilized to add such features to the traffic generated by the nodes 14 of the proxy network 32. Those of ordinary skill in the art may devise many such variations in the selection and instruction of nodes 14 to send traffic to a target 12 in accordance with the techniques presented herein.

D4. Reporting Variations

A fourth aspect that may vary among embodiments of these techniques relates to reporting to the source 18 initiating a target request 48 the results of the traffic sent to a target 12. As a first example, a node 14 may simply report to a node manager 42 that traffic was sent to the target 12 in fulfillment of the instruction (e.g., indicating a time, type, and volume of the sent traffic). As a second example, a target 12 that receives traffic from the nodes 14 may respond by sending data, such as content or files, and/or by exhibiting a change in behavior that may be of interest to the source 18 (e.g., providing an innocuous response to the traffic, but initiating a port scan of the node 14 to identify exploitable vulnerabilities). In these and other scenarios, the nodes 14 may be configured to report sent traffic and/or detectable results of the traffic sent to the target 12 to the source 18, e.g., by generating a traffic report that may be sent to the node manager 42, which may in turn forward it to a proxy network manager 46 and on to the source 18 of the target request 48. Alternatively or additionally, the node managers 42 may detect the exchange of traffic between the nodes 14 and the target 12, and may generate traffic reports indicating various aspects of the traffic. Such traffic reports may indicate, at varying levels of detail, various types of contact properties of the contact between the nodes 14 and the target 12. Such contact properties may be selected from a contact property set including a node identifier identifying the node 14 involved in the contact; a network route established to exchange traffic between a node 14 and a target 12; a network volume of the traffic exchanged between the node 14 and the target 12; and a target response received from the target 12 in response to the contact from the node 14.

As a second variation of this fourth aspect, traffic generated by respective nodes 14 may be identifiably associated with the activity resulting in the traffic. For example, a node 14 may be associated with a traffic request identifier, such as an identifying integer that enables tracing the traffic generated by the node 14 to the source 18, target 12, proxy network 32, target request 48, or traffic request 50. A target request 48 may specify that nodes 14 selected to send traffic to a target 12 include a particular traffic request identifier (e.g., in the traffic sent to the target 12 and/or the traffic reports of the traffic).

As a third variation of this fourth aspect, an embodiment of these techniques may be configured to detect compromised nodes 14 of the proxy network 32. For example, traffic reports indicating the reactions of a target 12 to traffic sent from a node 14 may be evaluated to determine whether the target 12 has identified the node 14 as associated with a source 18, a traffic request 50, or a proxy network 32, a proxy network manager 46, a node manager 42, or a target request 48. Because the continued use of the node 14 to send traffic to a target 12 may further compromise the obscurity and effectiveness of the proxy network 32, it may be advantageous to exclude the node 14 from future requests to send traffic to this or any other target 12. For example, upon detecting behavior of a target 12 indicating a suspicion that a proxy network 32 may be involved (e.g., the presence of compromised traffic, such as sending benign content to a node 14 instead of malware), a network proxy manager 46 may be configured to, identify at least one traffic request identifier associated with the traffic sent to the target 12 that resulted in the compromised traffic; identify one or more compromised nodes 14 associated with the traffic request identifier; and request the node managers 42 to exclude the compromised nodes 14 from sending traffic to a target 12 in the future. The node managers 42 may comply by with requests to exclude compromised node 14 from sending traffic to targets 12 in the future by storing the compromised node 14 (e.g., recording the network address of the compromised node 14), and fulfilling future selections of nodes 14 for future traffic requests 48 by selecting nodes 14 other than compromised nodes. In this manner, the proxy network 32 may adapt to exclude compromise nodes 14 in order to preserve the effectiveness of the remaining nodes 14 of the proxy network 32. Those of ordinary skill in the art may devise many techniques for reporting and using the results of traffic sent by the nodes 14 to targets 12 in accordance with the techniques presented herein.

E. Computing Environment

Figure 9:
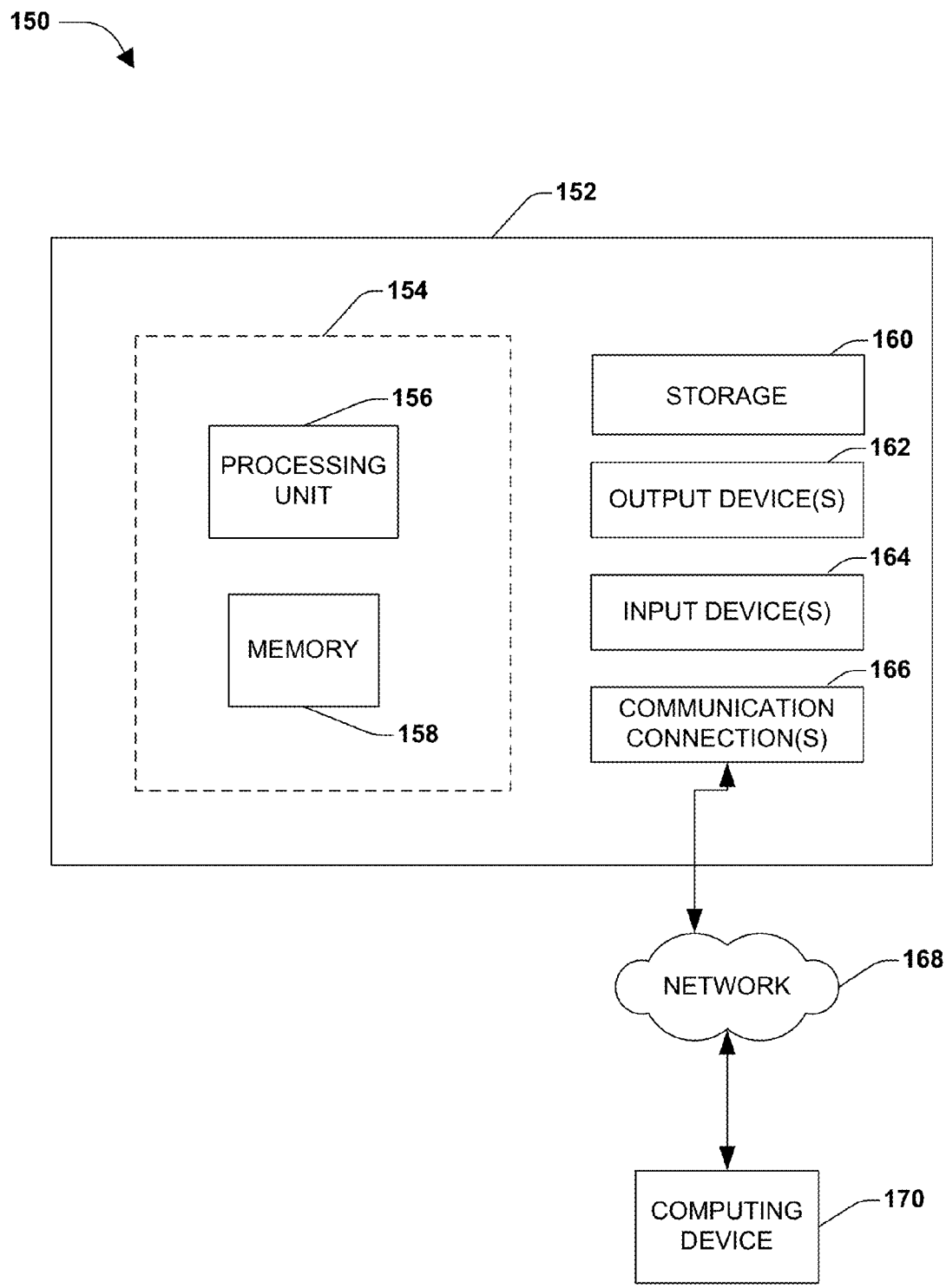
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 9 by dashed line 154.

In other embodiments, device 152 may include additional features and/or functionality. For example, device 152 may also include additional storage (e.g., removable and/or non-removable) including, but not limited to, magnetic storage, optical storage, and the like. Such additional storage is illustrated in FIG. 9 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 152 may access computing device 170 and download a part or all of the computer readable instructions for execution. Alternatively, computing device 152 may download pieces of the computer readable instructions, as needed, or some instructions may be executed at computing device 152 and some at computing device 170.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of sending traffic on behalf of sources to targets using node managers managing nodes having node properties, the method using a device having a processor and comprising:
   executing on the processor instructions configured to:
      upon receiving from a node manager a node descriptor identifying node properties of at least one node managed by the node manager, store the node descriptor; and
      upon receiving from a source a target request identifying a target and at least one selected node property:

using the node descriptors, select at least one selected node manager managing nodes that satisfy the selected node properties; and
send to the at least one selected node manager a traffic request to instruct at least one node satisfying the selected node properties to generate traffic between the node and the target.

2. The method of claim 1, the node properties selected from a node property set comprising:
a geographical location node property;
a network carrier node property; and
a network uplink connection type node property;
a network address node property;
a network domain node property; and
a device type node property.

3. The method of claim 1:
the target request specifying at least one traffic property of traffic to be sent to the target;
selecting the node selected managers comprising: selecting node managers managing nodes capable of sending traffic to the target that exhibits the traffic property; and
sending the traffic request to the node managers comprising: sending to the selected node managers a traffic request to instruct at least one node satisfying the selected node properties to send traffic to the target that exhibits the traffic property.

4. The method of claim 3, the traffic properties selected from a traffic property set comprising:
a traffic volume property;
a traffic variance property among the nodes sending the traffic to the target;
a traffic source anonymity property anonymizing the source from the target; and
a traffic source identifying property identifying the source to the target.

5. The method of claim 1:
the target request not identifying at least one node property of the nodes to be selected to send traffic to the target; and
the instructions configured to, for respective node properties not specified in the target request, select a default node property.

6. The method of claim 1:
respective node managers configured to report a traffic load of the traffic sent from the nodes managed by the node manager to at least one target; and
selecting node managers for sending a traffic request in response to a request comprising: selecting node managers for the traffic request that balance the traffic sent from the nodes managed by the node managers to the targets.

7. The method of claim 1, the traffic request requesting the selected node managers to instruct the nodes to send traffic to the target through at least one intermediate service.

8. The method of claim 1, the instructions configured to, upon receiving from a selected node manager a traffic report indicating the traffic sent from at least one node to the target, send the traffic report to the source.

9. The method of claim 8, the traffic report specifying at least one contact property of traffic sent from at least one node to the target, the at least one contact property selected from a contact property set comprising:
a node identifier identifying the node;
a network route between the node and the target;
a network volume of the traffic between the node and the target; and
a target response received from the target in response to at least one contact from the node.

10. The method of claim 8:
the traffic request comprising a traffic request identifier; and
the traffic request requesting the selected node managers to include the traffic request identifiers in traffic reports indicating the traffic sent from at least one node to the target in response to the target request.

11. The method of claim 10, the instructions configured to, upon identifying compromised traffic received from a target:
identify at least one traffic request identifier associated with the traffic sent to the target that resulted in the compromised traffic;
identify at least one compromised node associated with the at least one traffic request identifier; and
request the node managers for respective compromised nodes to exclude the compromised nodes from sending traffic to a target.

12. A method of instructing nodes to send traffic to at least one target on behalf of at least one source on a computer having a processor, the method comprising:
executing on the processor instructions configured to:
upon receiving from a node that is managed by the computer at least one node descriptor of the node, store the node descriptor of the node; and
upon receiving from a source a target request identifying a target and at least one selected node property:
using the node descriptors, select at least one selected node that is managed by the computer and that satisfies the selected node properties; and
instruct the respective at least one selected node to generate traffic between the selected node and the target.

13. The method of claim 12:
the target request specifying at least one traffic property of traffic to be sent to the target; and
instructing the selected nodes comprising: instructing the selected nodes to send traffic to the target that exhibits the traffic property.

14. The method of claim 12, the instructions configured to:
for respective selected nodes, monitor traffic sent from the selected node to the target; and
send to the source a traffic report indicating the traffic sent from the selected nodes to the target.

15. The method of claim 14:
the traffic request comprising a traffic request identifier; and
the instructions configured to insert the traffic request identifiers into traffic reports indicating the traffic sent from at least one node to the target in response to the target request.

16. The method of claim 14:
the traffic request comprising a traffic request identifier; and
instructing the selected nodes comprising: instructing the selected nodes to associate the traffic request identifier with the traffic sent from the selected node to the target.

17. The method of claim 12, the instructions configured to:
upon receiving a request to exclude at least one compromised node from sending traffic to a target, store the compromised node; and
selecting the selected nodes in response to a target request comprising: selecting from the nodes not comprising compromised nodes at least one selected node satisfying the selected node properties.

18. The method of claim 12:
the instructions configured to monitor a traffic load of respective monitored nodes; and
selecting the selected nodes comprising: selecting at least one selected node satisfying the selected node properties and using the traffic loads of the monitored nodes.

19. The method of claim 12, the instructions configured to:
for respective monitored nodes having a public network address that is transmitted to the target, select a private network address;
for traffic sent from respective monitored nodes to the target, replace the private network address in the traffic with the public network address; and
for traffic received from the target for a monitored node, replace the public network address in the traffic with the private network address.

20. A memory device storing instructions that, when executed on a processor of a computer, cause the computer to send traffic on behalf of sources to targets using node managers managing nodes having node properties, by:
upon receiving from a node manager a node descriptor identifying node properties of at least one node managed by the node manager, storing the node descriptor; and
upon receiving from a source a target request identifying a target and at least one selected node property:
using the node descriptors, selecting at least one selected node manager managing nodes that satisfy the selected node properties; and
sending to the at least one selected node manager a traffic request to instruct at least one node satisfying the selected node properties to generate traffic between the node and the target.

* * * * *